United States Patent [19]

Spielhoff

[11] 4,192,617
[45] Mar. 11, 1980

[54] SCREW EXTRUDER FOR PROCESSING RUBBER OR PLASTICS MATERIAL

[75] Inventor: Horst Spielhoff, Aligse, Fed. Rep. of Germany

[73] Assignee: Hermann Berstorff Maschinenbau GmbH, Fed. Rep. of Germany

[21] Appl. No.: 898,436

[22] Filed: Apr. 20, 1978

[30] Foreign Application Priority Data

Apr. 29, 1977 [DE] Fed. Rep. of Germany ....... 2719095

[51] Int. Cl.² .......................... B29B 1/10; B29F 3/02
[52] U.S. Cl. ..................................... 366/83; 366/301; 366/322; 425/204; 425/207; 425/209
[58] Field of Search ............... 425/204, 206, 207, 208, 425/209; 264/349; 366/69, 83, 90, 91, 318, 322, 301

[56] References Cited

U.S. PATENT DOCUMENTS

| 2,632,203 | 3/1953 | De Laubarede | 264/349 |
|---|---|---|---|
| 3,640,669 | 2/1972 | Hanslik | 425/204 |
| 3,767,754 | 10/1973 | Manning et al. | 264/349 |
| 3,901,486 | 8/1975 | Matsui | 425/204 |
| 3,913,897 | 10/1975 | Hanslik | 425/208 |

FOREIGN PATENT DOCUMENTS

| 2158246 | 5/1973 | Fed. Rep. of Germany | 425/204 |
|---|---|---|---|
| 2303366 | 7/1974 | Fed. Rep. of Germany | 264/349 |
| 902513 | 8/1962 | United Kingdom | 425/204 |
| 955942 | 4/1964 | United Kingdom | 425/204 |

*Primary Examiner*—James B. Lowe
*Attorney, Agent, or Firm*—Donald D. Jeffery

[57] ABSTRACT

A screw extruder for processing rubber or plastics material, comprising a cylinder jacket with a feed hopper, a central geared shaft and geared planet shafts disposed between the central shaft and the cylinder jacket and drivably engaged with the central shaft and the cylinder jacket, wherein parts of at least some of the planet shafts are bare of gearing.

Advantageously each alternate planet shaft is only partly geared, the gearing extending for only approximately half the length of the shaft, at one end or the other end or in two quarter length portions at the opposite ends. Alternatively each third planet shaft is only partly geared.

Preferably each geared part of a planet shaft which is only partly geared overlaps with a geared part of the planet shaft which follows it in the direction of rotation.

9 Claims, 4 Drawing Figures

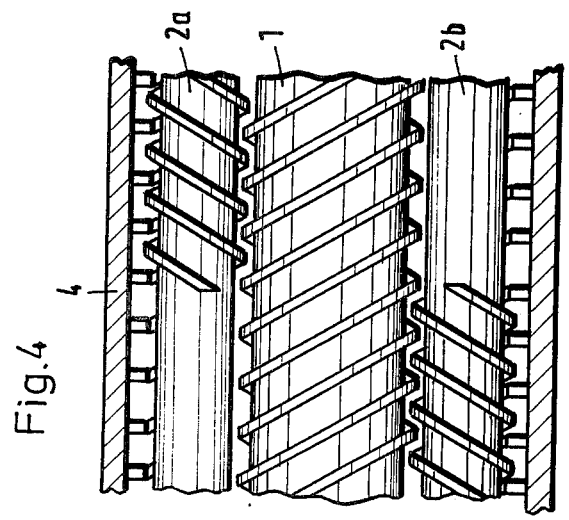
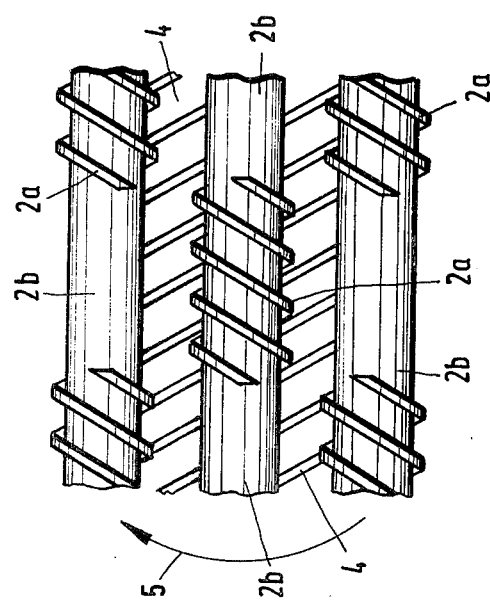

SCREW EXTRUDER FOR PROCESSING RUBBER OR PLASTICS MATERIAL

The invention concerns a screw extruder for the processing of plastics, rubber and plastic materials, comprising a cylinder with feeding hopper, a central shaft and planet shafts located between the central shaft and the cylinder jacket and engaging with both.

A screw extruder of this kind is described in West German Patent Specification No. 11 77 808. Planet shafts are arranged around a central shaft and the material to be processed is subjected to intensive kneading and shearing between the planet shafts and the central shaft and the planet shafts and the cylinder jacket. Since both the central shaft and the planet shaft are helically geared, the material is at the same time transported towards an outlet end of the extruder. It is easily apparent, that the material is thereby subjected to extremely intense mixing, kneading and shearing effects.

The intensive processing of material leads in the case of certain materials, to a rise in temperature due to the shear energy input which can, to some extent, be reduced again by cooling the central shaft and/or the extruder cylinder jacket. If, however, the speed of the central shaft is increased, in order to increase the output of the extruder, to give more economic use, then the shear energy input can no longer be reduced through cooling of the central shaft and of the cylinder jacket. Therefore undue restrictions are placed on the increasing of the speed of the central shaft which leads to an increase in the output of the extruder and its profitability.

The invention has among its objects to provide a screw extruder of the planet rolling kind, which can process various material without exceeding their temperature capacity. The invention also has among its objects to provide a machine designed to permit varying degrees of plastification of materials to be processed in the machine, without having to employ another type of machine or another size of machine for materials sensitive to temperature.

According to the invention there is provided a screw extruder for processing rubber or plastics material, comprising a cylinder jacket with a feed hopper, a central geared shaft and geared planet shafts disposed between the central shaft and the cylinder jacket and drivably engaged with the central shaft and the cylinder jacket, wherein parts of at least some of the planet shafts are bare of gearing.

In one embodiment each alternate planet shaft is only partly geared, the gearing extending approximately half the length of the shaft at one end or the other end or in two quarter length portions at the opposite ends. Good results can be achieved by providing every third planet shaft with only a short guide gearing at each of its ends.

The advantages of the planet rolling press of the invention is primarily that by inserting planet shafts correspondingly suited to the particular material to be processed, the desired degree of plastification can be achieved without having to employ another machine. For example, for the processing of PVC powder which must be carried out within a very limited temperature range, each alternate planet shaft is preferably geared over only approximately half its length. Thus the material as is passes around each individual planet shaft is subjected to considerably less shearing on reaching each alternate ungeared shaft, thus interrupting the input of shear energy into the material. This can result in the speed of the central shaft being maintained through the reduced shearing of the material accompanied by a likewise reduced increase in temperature. The output of the machine however is not thereby reduced.

If for example the process temperature is found to be too high when measured with a temperature gauge, then alternate shafts can be exchanged for shafts with less gearing to ensure that the increase in the temperature of the material is kept within allowable limited.

For the processing of high viscosity material it is sufficient if every third shaft is partly geared. In the case of a material having an even higher viscosity and being more sensitive to temperature, thereby permitting an even more limited range of temperature increase, it is advisable in certain circumstances to gear each shaft over approximately three-quarters of its length and to leave one quarter ungeared.

It is expedient to arrange the individual geared parts of the planet shafts around the central shaft in such a way that the conveying and cleaning action is not lost. To this end the length of a geared part of a planet shaft must in each case overlap with the length of the geared part of a planet shaft following in the direction of rotation.

It is possible to achieve the required plastification while maintaining the same speed and thus the same output of the machine by using planet shafts designed correspondingly with intermittent gearing, gearing of differing lengths or with ungeared ends.

The machine operator has only to keep a set of suitably designed planet shafts ready to be inserted according to the material being processed.

Furthermore it must be stressed that in the case of existing planet rolling presses it is likewise possible to modify these presses to a specific process by inserting correspondingly designed planet shafts. Therefore when a different material is required to be processed which at the same output requires a considerably more careful processing, then it is not necessary to employ a new machine for this purpose.

The invention is diagrammatically illustrated by way of example in the accompanying drawings, in which:

FIG. 3 is a sectional development showing several planet gears and the gear of a fixed cylinder, and FIG. 4 is a longitudinal section through part of another embodiment of a screw extruder according to the invention of the planet rolling kind.

Figure 1:
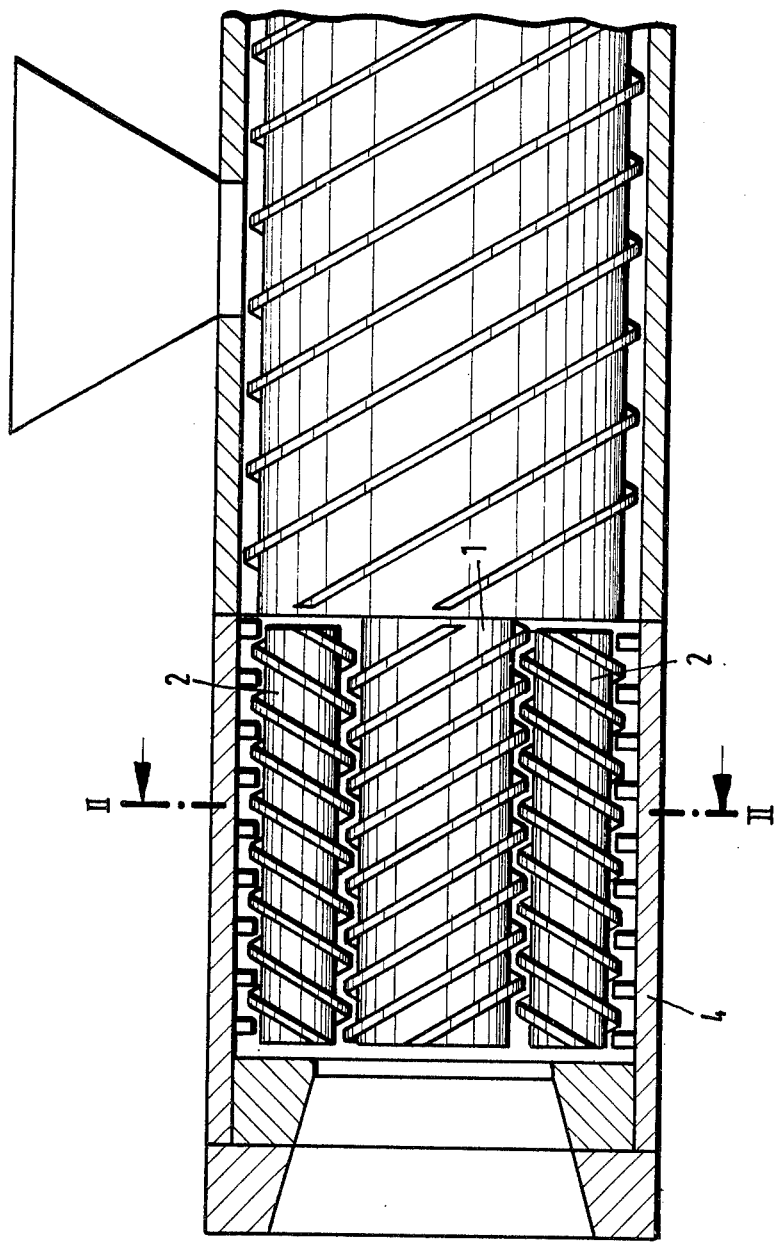
FIG. 1 is a longitudinal section through a screw extruder of known kind of the planet rolling kind.
Figure 2:
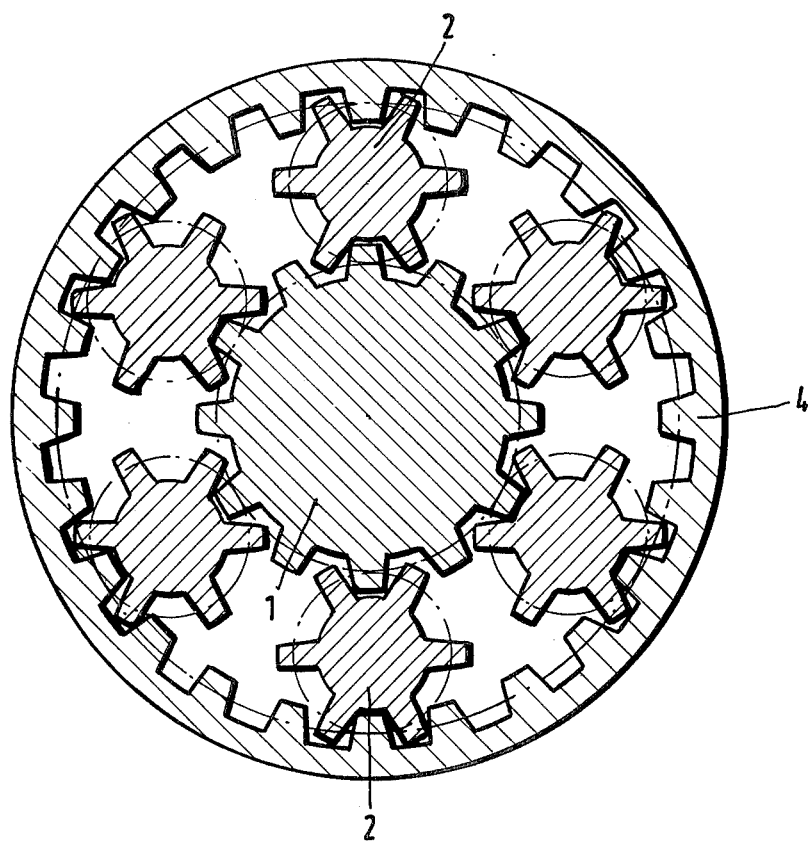
FIG. 2 is a sectional view taken on line II—II of FIG. 1.

The planet rolling extruder illustrated in FIGS. 1 and 2 has a central shaft 1 and the six floating planet shafts 2 disposed around it. The central shaft 1 and the planet shafts 2 are arranged in a fixed cylinder 4 having a gear on its inner face. The gear ensures that the planet shafts 2 as they are rotated by the gearing on the central shaft 1 with which they are meshed, roll themselves around the central shaft 1. During the engaging of the gears, the material is repeatedly rolled for a short period in the grooves between the gear teeth cushioned by the backlash of the gearing, additives being thereby ground and distributed.

FIG. 3 is a sectional development showing several planet shafts arranged next to each other in a screw extruder according to the invention. The planet shafts have geared parts 2a and ungeared parts 2b. This diagram shows in particular that the geared parts 2a of each planet shaft overlaps with at least one of the geared parts 2a of the planet shaft which follows it in the direction of rotation, to ensure a conveying and cleaning action. FIG. 3 is an example selected at random which can be varied in many ways but it must be ensured that overlapping of the gearing in the direction of rotation, indicated by arrow 5, takes place. The gearing of the alternate planet shafts at the opposite sides of FIG. 3 can cover approximately one quarter of their length at both the hopper and discharge ends, as shown.

FIG. 4 shows another possible variation of the partial gearing of the planet shafts whereby in each case the gearing has been removed from approximately half of each planet shaft. Such removal can be, as illustrated, at the end of the extruder adjacent the hopper, or at the opposite, discharge end.

What is claimed is:

1. A screw extruder for processing rubber and plastics materials comprising a cylinder jacket with a feed hopper, a central geared shaft and geared planet shafts disposed between said central shaft and said cylinder jacket and drivably engaged with said central shaft and said cylinder jacket, wherein parts of some of said planet shafts are bare of gearing.

2. A screw extruder as claimed in claim 1, wherein each alternate one of said planet shafts is geared for only a part of its length.

3. A screw extruder as claimed in claim 1, wherein each alternate one of said planet shafts is geared for approximately half its length.

4. A screw extruder as claimed in claim 1, wherein each alternate one of said planet shafts is geared for approximately that half of its length located at the end of the extruder at which said feed hopper is located.

5. A screw extruder as claimed in claim 1, wherein each alternate one of said planet shafts is geared for approximately half of its length located at the end of the extruder opposite to the end thereof at which said feed hopper is located.

6. A screw extruder as claimed in claim 1, wherein each alternate one of said planet shafts is geared over approximately one quarter of its length located at the end of the extruder at which said feed hopper is located and over approximately one quarter of its length at the end of the extruder opposite to the end thereof at which said feed hopper is located.

7. A screw extruder as claimed in claim 1, wherein each third one of said planet shafts is only partly geared.

8. A screw extruder as claimed in claim 1, wherein each third one of said planet shafts is provided with only short guide gearing at each of its ends.

9. A screw extruder as claimed in claim 1, wherein the length of the geared part of each of said planet shafts overlaps with the geared length of that one of said planet shafts which follows it in the direction of orbital movement of said planet shafts in said cylinder jacket.

* * * * *